United States Patent
Mabote

(10) Patent No.: US 11,775,263 B2
(45) Date of Patent: Oct. 3, 2023

(54) CONTROL CODE GENERATION AND COLLABORATION USING ACTIVE MACHINE LEARNING

(71) Applicant: Rockwell Automation Technologies, Inc., Mayfield Heights, OH (US)

(72) Inventor: Itumeleng Mabote, Randburg (ZA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/018,374

(22) Filed: Sep. 11, 2020

(65) Prior Publication Data

US 2022/0083318 A1    Mar. 17, 2022

(51) Int. Cl.
| | |
|---|---|
| *G06F 8/35* | (2018.01) |
| *G06N 20/00* | (2019.01) |
| *G06F 8/33* | (2018.01) |
| *G06N 5/04* | (2023.01) |

(52) U.S. Cl.
CPC .................. *G06F 8/35* (2013.01); *G06F 8/33* (2013.01); *G06N 5/04* (2013.01); *G06N 20/00* (2019.01)

(58) Field of Classification Search
CPC ..... G06F 8/35; G06F 8/33; G06F 8/10; G06F 8/34; G06N 5/04; G06N 20/00; G05B 19/042; G05B 19/05
See application file for complete search history.

(56) References Cited

U.S. PATENT DOCUMENTS

| | | | |
|---|---|---|---|
| 7,823,069 B1 * | 10/2010 | Tanner | ........... H04L 41/082 715/745 |
| 9,058,317 B1 | 6/2015 | Gardner et al. | |
| 2009/0089234 A1 | 4/2009 | Sturrock et al. | |

(Continued)

FOREIGN PATENT DOCUMENTS

WO    2018/183275 A1    10/2018

OTHER PUBLICATIONS

Extended European Search Report received for E.P Patent Application Serial No. 21180271.5 dated Dec. 7, 2021, 12 pages.

(Continued)

*Primary Examiner* — Cesar B Paula
*Assistant Examiner* — John M Heffington
(74) *Attorney, Agent, or Firm* — Amin, Turocy & Watson, LLP

(57) ABSTRACT

A control code collaboration system automatically generates control code for an industrial project based on text discovered within the design documents. The system allows a designer to highlight text within a text-based design document representing an interlock definition, step sequence definition, tag name, or other aspects of the design description. The system then allows the user to link annotations to the highlighted text, the annotations representing interlock programming, sequence programming, or controller tag names. The system then searches the document for similarly formatted text, which are assumed to represent descriptions of similar control aspects, and infers suitable control programming from these discovered pieces of text using the previously provided annotations as a guide. In this way, the system uses text pattern recognition generates suggestions as to how to program portions of the design description based on control logic examples provided by the user.

20 Claims, 16 Drawing Sheets

(56) References Cited

U.S. PATENT DOCUMENTS

| | | | |
|---|---|---|---|
| 2010/0049335 A1* | 2/2010 | Assarsson | G05B 19/042 |
| | | | 700/9 |
| 2015/0156210 A1* | 6/2015 | Hunt | H04L 63/1408 |
| | | | 726/23 |
| 2017/0357927 A1* | 12/2017 | Antonio | G06F 8/30 |
| 2020/0117446 A1 | 4/2020 | Smith et al. | |
| 2020/0257755 A1 | 8/2020 | Staar et al. | |

OTHER PUBLICATIONS

Communication Pursuant to Article 94(3) EPC received for E.P Patent Application Serial No. 21180271.5 dated Aug. 19, 2022, 5 pages.

\* cited by examiner

Effluent Sump Project

| Tag No. | Equipment Description | Interlock Condition | Interlock Type ST | Interlock Type P | Interlock Type SA |
|---|---|---|---|---|---|
| 55-PCB-410 | Effluent Sump Feed Pump | Discharge manual valve open limit switch 55-ZSO-413 healthy | | X | |
| | | Suction manual valve open limit switch 55-ZSO-412 healthy | | X | |
| | | Suction auto drain valve closed limit switch 55-PSH-410 healthy | | X | |
| | | Either auto suction valve open limit switch 55-PSH-412 healthy OR auto forward flush valve open limit switch 55-ZSO-111 healthy | | X | |
| | | Discharge flow 55-FIT-410 > Lo (30 second timer) | | X | |
| 54-PCB-400 | Effluent Sump Liquor Return Pump | Discharge manual valve open limit switch 54-ZSO-401 healthy | | X | |
| | | Suction manual valve open limit switch 54-ZSO-400 healthy | | X | |
| | | Discharge flow 54-FIT-400 > Lo (30 second timer) | | X | |
| 54-PCB-401 | Effluent Sump Spillage Pump | Low level 54-LIT-401 > LoLo | | X | |

5. SUMP CIRCUIT CONTROL PHILOSOPHY

5.1 THICKENER PLANT CONTROL

The plant will be controlled in accordance with the vendor philosophy and functional specification. See Attachment A.

5.2 SUMP FEED PUMP CONTROL

The slurry is transferred using a fixed speed pump 55-PCB-410 to the Effluent Sump when necessary. The feed discharge flow rate is monitored by the flow transmitter 55-FIT-410.

5.3 SUMP RETURN PUMP CONTROL

The effluent sump is designed as a dual sump with three compartments. The main compartment has 3000m³ volumetric capacity and is fed directly, as deemed operationally

FIG. 4

CONTROL CODE GENERATION AND COLLABORATION USING ACTIVE MACHINE LEARNING

BACKGROUND

The subject matter disclosed herein relates generally to industrial automation systems, and, for example, to development of industrial control programming.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system for generating industrial control programming is provided, comprising a user interface component configured to render, on a client device, a text-based engineering document for an industrial automation system, and to receive selection of first text within the engineering document; an annotation component configured to receive, via the user interface component, annotation data describing first control logic for an interlock or step sequence to be implemented by an industrial controller of the industrial automation system, and to associate the annotation data with the first text; a code generation component configured to generate first control code for the interlock or step sequence based on the first control logic defined by the annotation data; a model update component configured to update a learning model based on the first text and the annotation data, wherein the learning model is trained to identify text having a format similar to that of the first text and to translate the text to control logic; and a document analysis component configured to identify, based on the learning model, second text having the format similar to that of the first text and to generate second control logic based on the second text and the learning model.

Also, one or more embodiments provide a method for generating industrial control code, comprising rendering, by a system comprising a processor, a text-based engineering document for an industrial automation system; receiving, by the system, selection of first text within the engineering document; receiving, by the system, annotation data describing first control logic for an interlock or step sequence to be implemented by an industrial controller of the industrial automation system; associating, by the system, the annotation data with the first text; generating, by the system, first control code for the interlock or step sequence based on the first control logic defined by the annotation data; training, by the system, a learning model based on the first text and the annotation data, wherein the learning model is trained to identify text having a format similar to that of the first text and to translate the text to control logic; identifying, by the system based on the learning model, second text having the format similar to that of the first text; and in response to the identifying, generating, by the system, second control logic based on the second text and the learning model.

Also, according to one or more embodiments, a non-transitory computer-readable medium is provided having stored thereon instructions that, in response to execution, cause a system comprising a processor to perform operations, the operations comprising displaying, on a client device, a text-based engineering document for an industrial automation system; receiving selection of first text within the engineering document; receiving annotation data describing first control logic for an interlock or step sequence to be implemented by an industrial controller of the industrial automation system; associating the annotation data with the first text; generating first control code for the interlock or step sequence based on the first control logic defined by the annotation data; training a learning model based on the first text and the annotation data, wherein the learning model is trained to identify text having a format similar to that of the first text and to translate the text to control logic; identifying, based on the learning model, second text having the format similar to that of the first text; and in response to the identifying, generating second control logic based on the second text and the learning model.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 4 is a portion of an example engineering document that can be imported into the coding collaboration system and used to generate control code for a control project.

DETAILED DESCRIPTION

Figure 1:
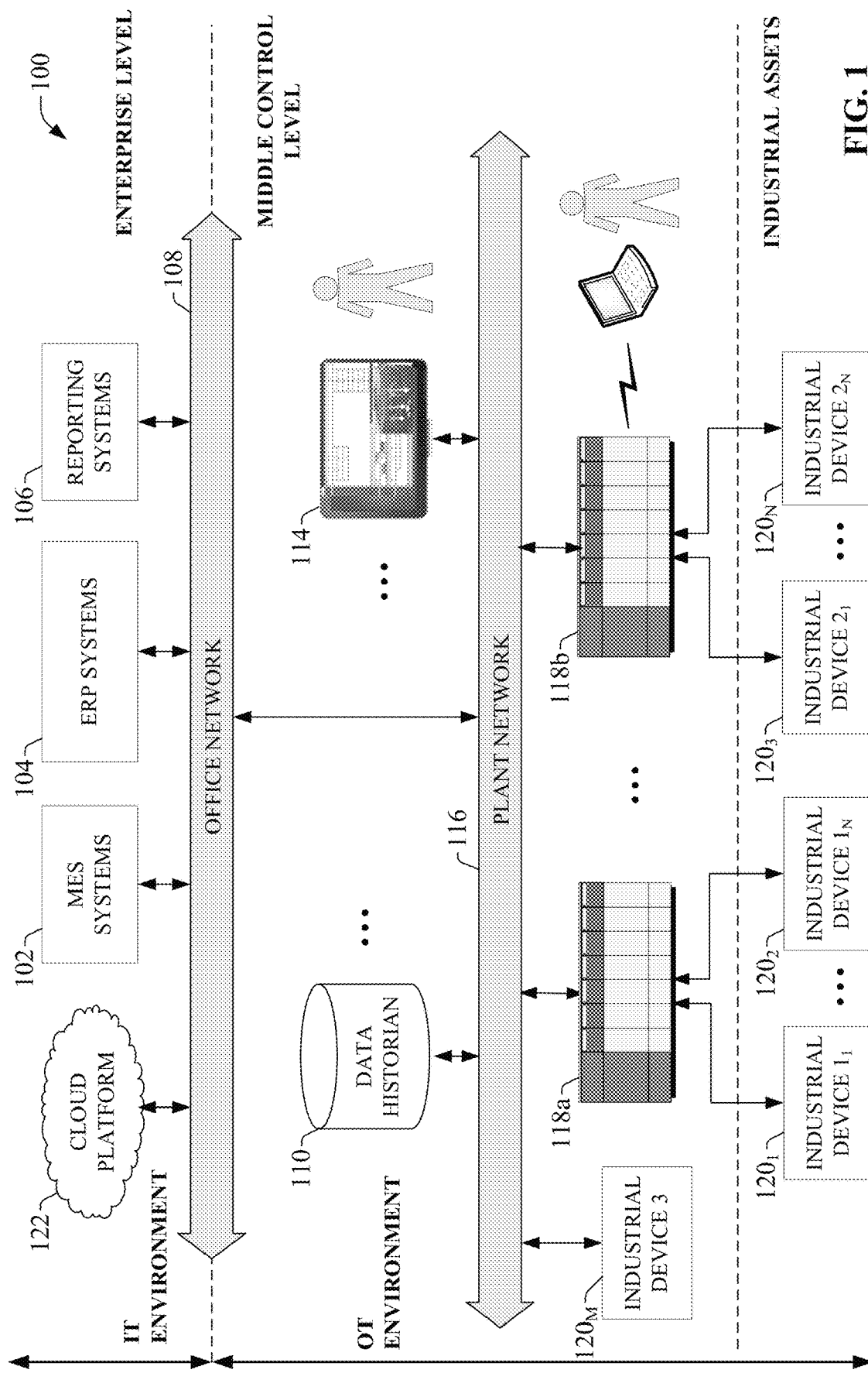
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers, including cloud-based computing systems. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, C++, Python, Javascript, or other such platforms.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer, on a server blade, or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

Text-based design documents are typically generated during the design phase for new industrial automation projects, including control philosophy and functional design specifications. Among other design facets of the new system, these documents may describe, in plain language, step sequences and interlocks that must be incorporated into the control system design. Control engineers reference these documents when designing and programming the control system for the new automation system, using these documents as a guide to ensure that the requisite interlocks and sequences are including in the control programming that will be installed and executed on the industrial controller that will be monitoring and controlling the new system.

Writing control code to the specifications set forth in the design documents can be laborious and prone to error, particularly in the case of projects that include a large number of I/O points, since the engineer is required to manually search for and review each line of the design documents, verify that the correct I/O point or interlock is being viewed, and correctly translate the plain language description into suitable control code (e.g., ladder logic programming, function block diagram programming, a sequential function chart, etc.). Subsequent review of the written control code to ensure that the control programming aligns with the written design specifications can also be a painstaking and prolonged process, since the reviewer must compare the code to the design documents in a line-by-line manner.

Moreover, if multiple control engineers are developing control code for the project in parallel, the resulting aggregate control code may lack consistency in terms of coding styles used to program interlocks and step sequences.

To address these and other issues, one or more embodiments described herein provide a control code collaborating system that can automatically generate control code for an industrial project based on text discovered within the design documents, in accordance with annotations provided by a designer. In one or more embodiments, the system can allow a designer to import a text-based design document and highlight, within the document, text that describes an interlock definition, a step sequence definition, a tag name, or other aspects of the design description relevant to development of the control code. The system also allows the user to link annotations to the highlighted text. These annotations define interlock programming, sequence programming, or controller tag names for the interlock or sequence described by the selected text. The system translates these annotations to executable control code for the interlock or sequence that can be incorporated into the control program for the automation system.

The information provided by the user in this manner—the identification of text representing an example interlock or step sequence description, and the annotation data defining the control logic to be used to implement the interlock or sequence—trains the system to identify other descriptions of interlocks and sequences within the engineering document, and to generate control code for these other interlock and sequence descriptions. Accordingly, the system searches the document for text segments having a format similar to that of the text previously selected by the user, and these discovered text segments are assumed to represent functional descriptions of similar control aspects. The system then infers suitable control programming from these discovered pieces of text using the previously provided annotations as a guide. In this way, the system uses text pattern recognition to find similar pieces of text within the design document and generates suggestions as to how these portions of the design should be programmed based on previously provided code from the user, or from other users who are working collaboratively on control code development for the project. This approach can generate control code from design documents more quickly and easily relative to manually coding the entire project, and can also ensure a consistency of programming style throughout the control project.

Figure 2:
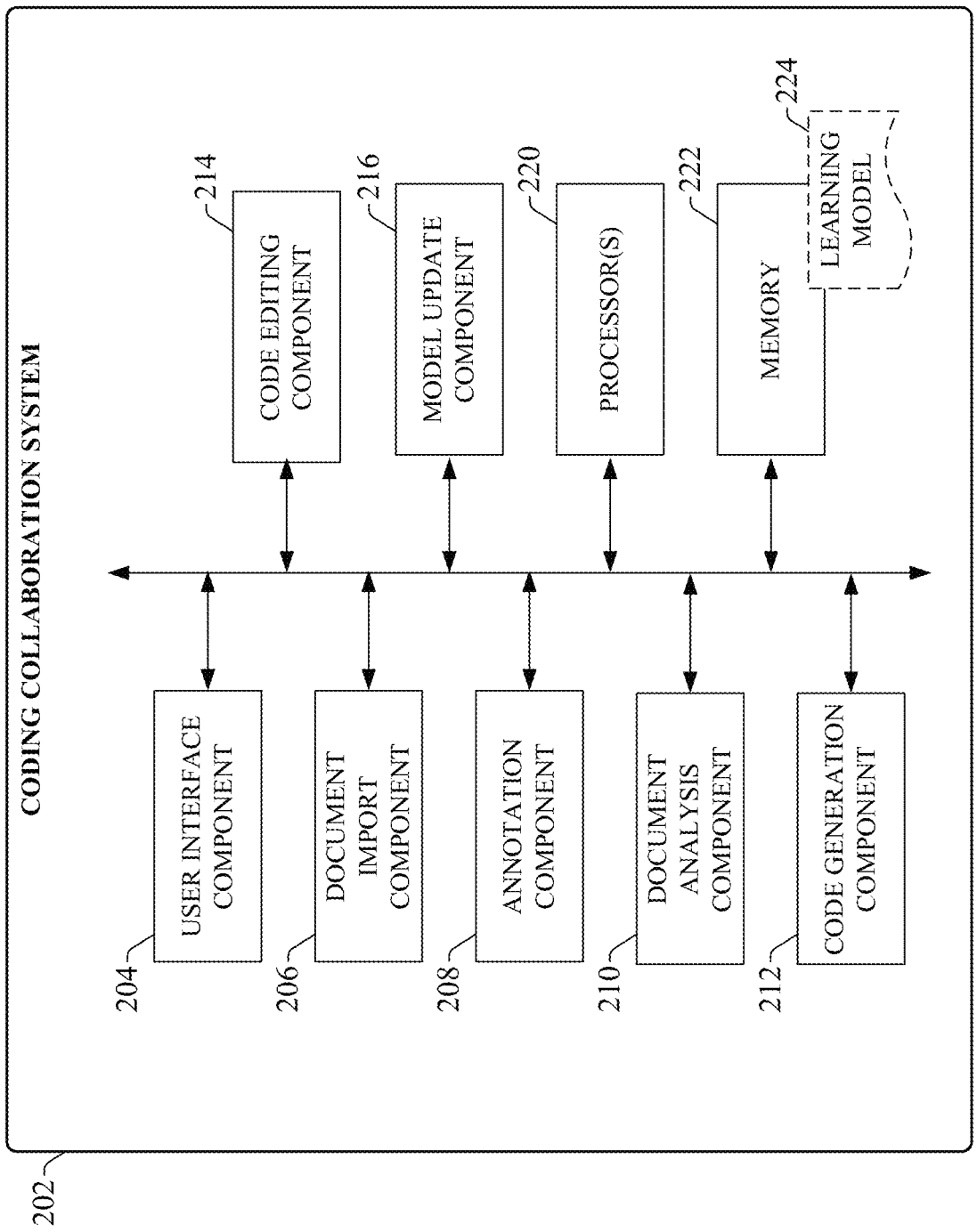
FIG. 2 is a block diagram of an example coding collaboration system.

FIG. 2 is a block diagram of an example coding collaboration system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Coding collaboration system 202 can include a user interface component 204, a document import component 206, an annotation component 208, a document analysis component 210, a code generation component 212, a code editing component 214, a model update component 216, one or more processors 220, and memory 222. In various embodiments, one or more of the user interface component 204, a document import component 206, an annotation component 208, a document analysis component 210, a code generation component 212, a code editing component 214, a model update component 216, the one or more processors 220, and memory 222 can be electrically and/or communicatively coupled to one another to perform one or more of the functions of the coding collaboration system 202. In some embodiments, components 204, 206, 208, 210, 212, 214, and 216 can comprise software instructions stored on memory 222 and executed by processor(s) 220. Coding collaboration system 202 may also interact with other hardware and/or software components not depicted in FIG. 2. For example, processor(s) 220 may interact with one or more external user interface devices, such as a keyboard, a mouse, a display monitor, a touchscreen, a smart phone, a tablet computer, an AR/VR wearable appliance, or other such interface devices.

User interface component 204 can be configured to receive user input and to render output to a user in any suitable format (e.g., visual, audio, tactile, etc.). In some embodiments, user interface component 204 can render interactive interface displays on a display device (e.g., a display device associated with a desktop computer, a laptop computer, a tablet computer, a smart phone, etc.), where the interface displays serve as the interface for the coding collaboration system 202. Example output that can be rendered on these interface displays can include, but are not limited to, renderings of design documents that have been imported into the system 202, annotation windows for receiving user annotations, control programming generated by the system 202, or other such output. User input that can be received via user interface component 204 can include, for example, selection input that selects sections of text within the rendered design document, annotations to be linked to the text (e.g., control programming, tag names, interlock descriptions, etc.), code editing input, or other such input.

Document import component 206 can be configured to import a design document—e.g., a control philosophy document, a functional specification document, etc.—into the system 202 for annotation and analysis. The document can be imported in any suitable format, including but not limited to a portable document format (PDF) file, an image file, an optical scan of a hard-copy print-out, or another document format.

Annotation component 208 can be configured to link control annotations entered by the user to selected subsets of text within the imported document. Document analysis component 210 can be configured to identify, within the design document, text having a similar format to that of the text that was selected and annotated by the user. Code generation component 212 can be configured to generate executable control programming based on the user-provided annotations and as well as discovered instances of text having a similar format as that of the annotated text. As will be discussed in more detail herein, both the document analysis component 210 and the code generation component 212 can perform their functions based on a learning model 224 maintained by the coding collaboration system 202.

Code editing component 214 can be configured to implement modifications or additions to the generated control code based on manual programming input entered by the user. The model update component 216 can be configured to update the learning model 224 based on annotations, code corrections, or other feedback provided by the user.

The one or more processors 218 can perform one or more of the functions described herein with reference to the systems and/or methods disclosed. Memory 222 can be a computer-readable storage medium storing computer-executable instructions and/or information for performing the functions described herein with reference to the systems and/or methods disclosed.

Figure 3:
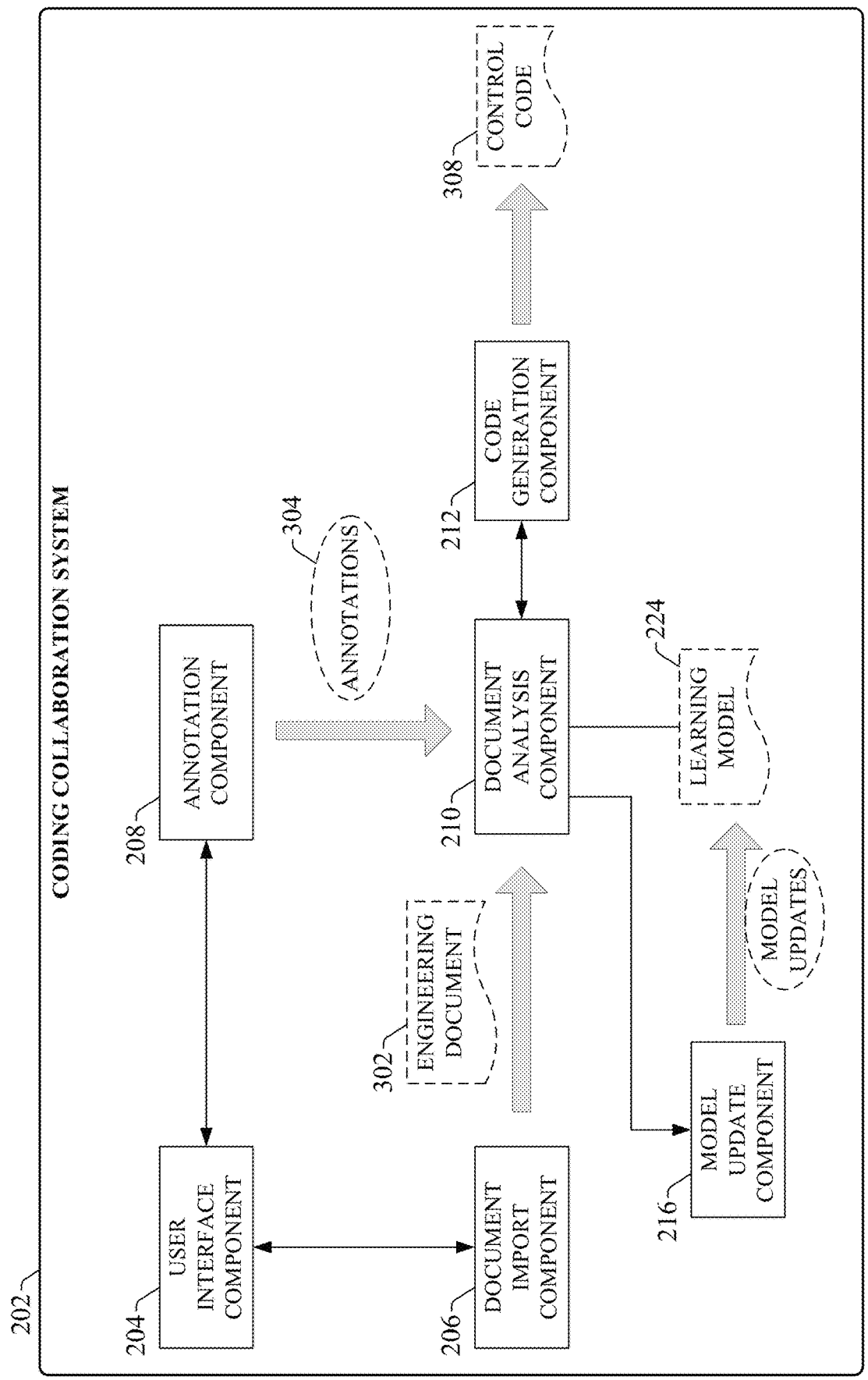
FIG. 3 is a diagram illustrating example data flows associated with the coding collaboration system.

FIG. 3 is a diagram illustrating example data flows associated with the coding collaboration system 202 according to one or more embodiments. In some embodiments, coding collaboration system 202 can execute on a server accessible by multiple client devices associated with different engineers who are collaborating on a common control project. The coding collaboration system 202 can also execute on a cloud platform as a cloud-based service in some embodiments, allowing engineers at diverse locations to remotely collaborate on control project development.

User interface component 204 can generate and serve user interface displays to authorized client devices. These interface displays provide access to the design tools supported by the coding collaboration system 202. Initially, import tools implemented by the document import component 206 can be used to import a text-based engineering document 302 into the system 202. This can be done by browsing to and opening the engineering document 302 within the development environment of the system 202, or by otherwise uploading the document 302 to the system 202. The engineering document 302 can be, for example, a functional design specification document or a control philosophy document that describes, in plain language, control requirements for the automation system being developed.

FIG. 4 is a portion of an example engineering document 302 that can be imported into the system 202 and used to generate control code for the project. This example engineering document 302 includes a table 402 describing interlock conditions to be associated with different tag numbers. Text within the table entries include references to tag numbers that identify input and output devices to be monitored and controlled by an industrial controller (e.g., a PLC). Output devices that can be identified by tag numbers can include, but are not limited to, pumps, pneumatic actuators, motor contactors, motor drives, operator signaling devices (e.g., stack lights, illuminators, etc.) or other such devices. Input devices can include, but are not limited to, limit switches, telemetry devices (e.g., level meters, flow meters, pressure meters, temperature meters, etc.), control panel devices (e.g., switches, pushbuttons, etc.), or other such input devices. Example engineering document 302 also includes a written control philosophy 404 divided into sections describing general control requirements for various items of equipment that make up the automation system (e.g., sump feed pump control, sump return pump control, etc.).

Table 402 comprises a Tag No. column that lists tag numbers corresponding to respective pumps, an Equipment Description column including descriptions of the equipment associated with each tag number, and an Interlock Condition column including descriptions of one or more interlock conditions that are to be applied to each piece of equipment identified by the tag numbers. The interlock conditions are written in plain language text, and are typically intended to be used as a guide for control engineers while developing the control program. That is, the control program should be written such that the control output to a piece of equipment represented by a tag number is conditional on the defined interlock conditions for that tag number being satisfied (e.g., discharge manual valve open limit switch is healthy, the discharge flow is greater than a defined low limit, etc.)

Returning to FIG. 3, user interface component 204 can render the imported engineering document 302 on the user's client device. Annotation tools implemented by the annotation component 208 can then be used highlight selected text blocks within the document that describe interlocks or sequences, and to assign annotations 304 to this selected text that describe the control logic for implementing the described interlock or sequence. To this end, the user interface component 204 can render an annotation window that allows the user to enter the annotations 304 and link the annotations to selected text blocks of the engineering document 302.

Figure 5:
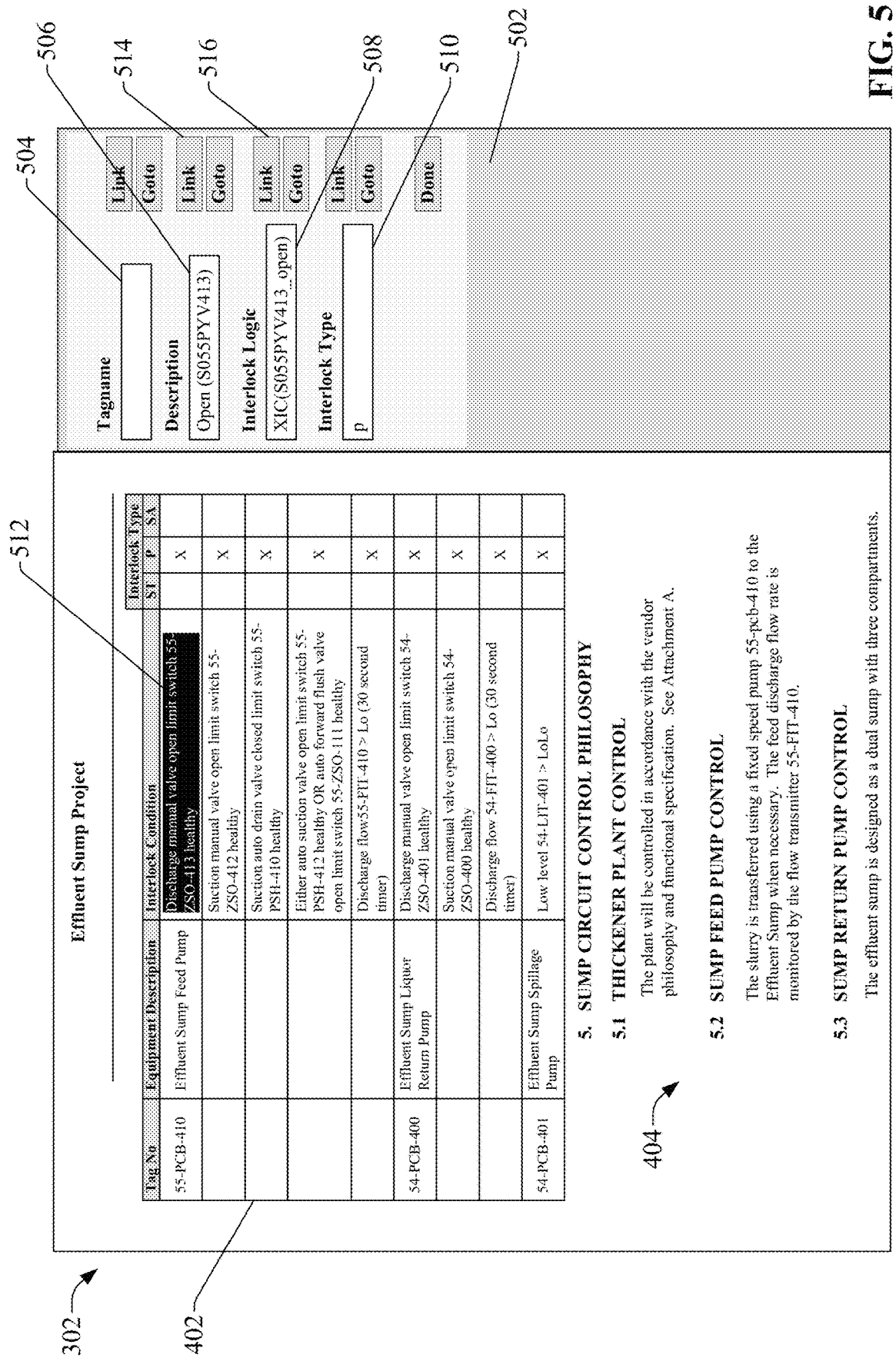
FIG. 5 is an example depiction of an engineering document rendered together with annotation window.

FIG. 5 is an example depiction of engineering document 302 rendered together with annotation window 502. Annotation window 502 can be invoked by initiating the annotation process via user interface component 204. In some embodiments, the user can indicate whether annotation to be entered is for an interlock or a step sequence, and the user interface component 204 will render, on the annotation window 502, the appropriate annotation data fields for entry of the selected type of annotation. In the example depicted in FIG. 5, the user has selected to enter interlock annotations. Accordingly, annotation window 502 includes a Tagname field 504, a Description field 506, an Interlock Logic field 508, and an Interlock Type field 510.

To create an interlock annotation, the user can select and highlight the text 512 within the engineering document 302 that describes the interlock condition currently being programmed. The user also enters a description and interlock logic for the interlock in the Description field 506 and Interlock Logic field 508, respectively, of the annotation window 502. The interlock logic is written in an alphanumeric format that can be translated to corresponding control code that is executable on an industrial controller. For example, the interlock logic "XIC(S055PYV413_open)" translates to an "examine if closed" ladder logic instruction linked to the state of the controller tag named "S055PYV413_open" (a tag indicating the open state of a value) in accordance with the logic format "XIC(<tagname>)." In another example, the user may enter the interlock logic as an "Examiner If Open" (XIO) instruction having the format "XIO(<tagname>)."

In some scenarios, more complicated logic for a given interlock may be entered as a function of multiple tags. For example, an interlock logic instruction may comprise multiple controller instructions—e.g., a combination of multiple XIC and/or XIO instructions—that are logically combined using Boolean AND and OR statements (e.g., "XIC(<tagname1>) AND XIO(<tagname2>)"). Other formats for defining interlock control logic are also within the scope of one or more embodiments of this disclosure.

With the selected text 512 highlighted and the annotation information to be associated with this text entered in the annotation window 502, the user can select the Link buttons 514 and 516 to link the entered annotations with the highlighted text 512. For example, in response to selection of the Link button 516 associated with the Interlock Logic field 508, the annotation component 208 creates and stores an association between the logic entered in the Interlock Logic field 508 and the highlighted text 512. Similarly, the annotation component 208 creates an association between the contents of the Description field 506 and the highlighted text 512 in response to selection of the Link button 514.

Figure 6:
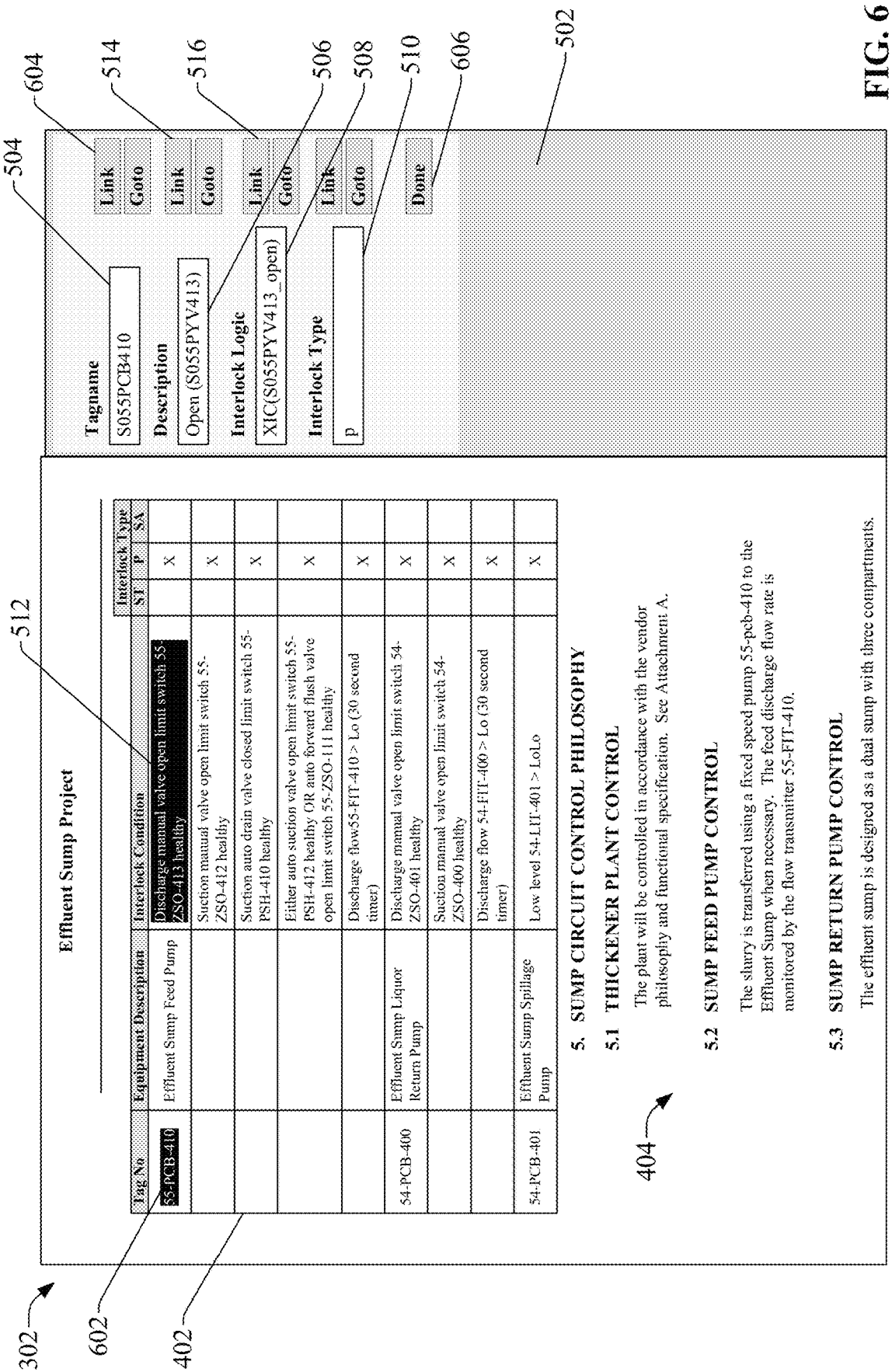
FIG. 6 is a depiction of an engineering document and annotation window in which a selected tag number within the engineering document is annotated with a tag name.

To complete the current interlock definition, the user selects and annotates the tag to which the interlock is to be applied. FIG. 6 is a depiction of engineering document 302 and annotation window 502 in which a selected tag number within the engineering document 302 (under the Tag No. column) is annotated with a tag name. Similar to the procedure used to annotate the interlock condition text 512 with interlock control logic, the user can highlight the tag number text 602 corresponding to the tag to which the interlock logic is to be applied, enter the name of the controller tag ("S055PCB410" in the present example) in the Tagname field 504, and select the Link button 604 associated with the Tagname field 504 to create an association between the entered tag name and the selected text 602. Once these annotations have been entered, the user can select the Done button 606 to initiate further analysis of the document 302 and generation of controller code.

Although the example depicted in FIGS. 5 and 6 demonstrates annotation of data in an interlock table 402, it is to be appreciated that annotations can be linked to any text within the document 302, including non-tabular text, without departing from the scope of this disclosure.

Figure 7A:
FIG. 7a is a first example ladder logic code segment.

Selection of the Done button 606 causes the code generation component 212 to generate or update executable interlock control code (e.g., a segment of ladder logic programming) based on the annotations entered by the user. In the example depicted in FIGS. 5 and 6, the entered interlock annotations are translated to the example ladder logic code segment depicted in FIG. 7a, in which an XIC instruction linked to the tag S055PYV413_open (as defined in the Interlock Logic field 508) controls the state of output tag S055PCB410 (as defined in the Tagname field 504). The description entered in the Description field 506 is added as a comment on the XIC instruction.

Additionally, selection of the Done button 606 causes the document analysis component 210 to analyze the remaining text of the engineering document 302 in view of the annotations entered by the user for the first interlock. In general, this analysis locates text blocks within the document 302 having a similar format to that of the selected text 512 and 602 to which the first interlock definition was applied, identifying these text blocks as potentially describing other interlocks for which interlock programming should be created. For each of these identified text portions, the document analysis component 210 also infers interlock logic for the discovered interlock description, and also infers the tag to which the interlock is to be applied, using previously entered annotations as a training template.

Figure 8:
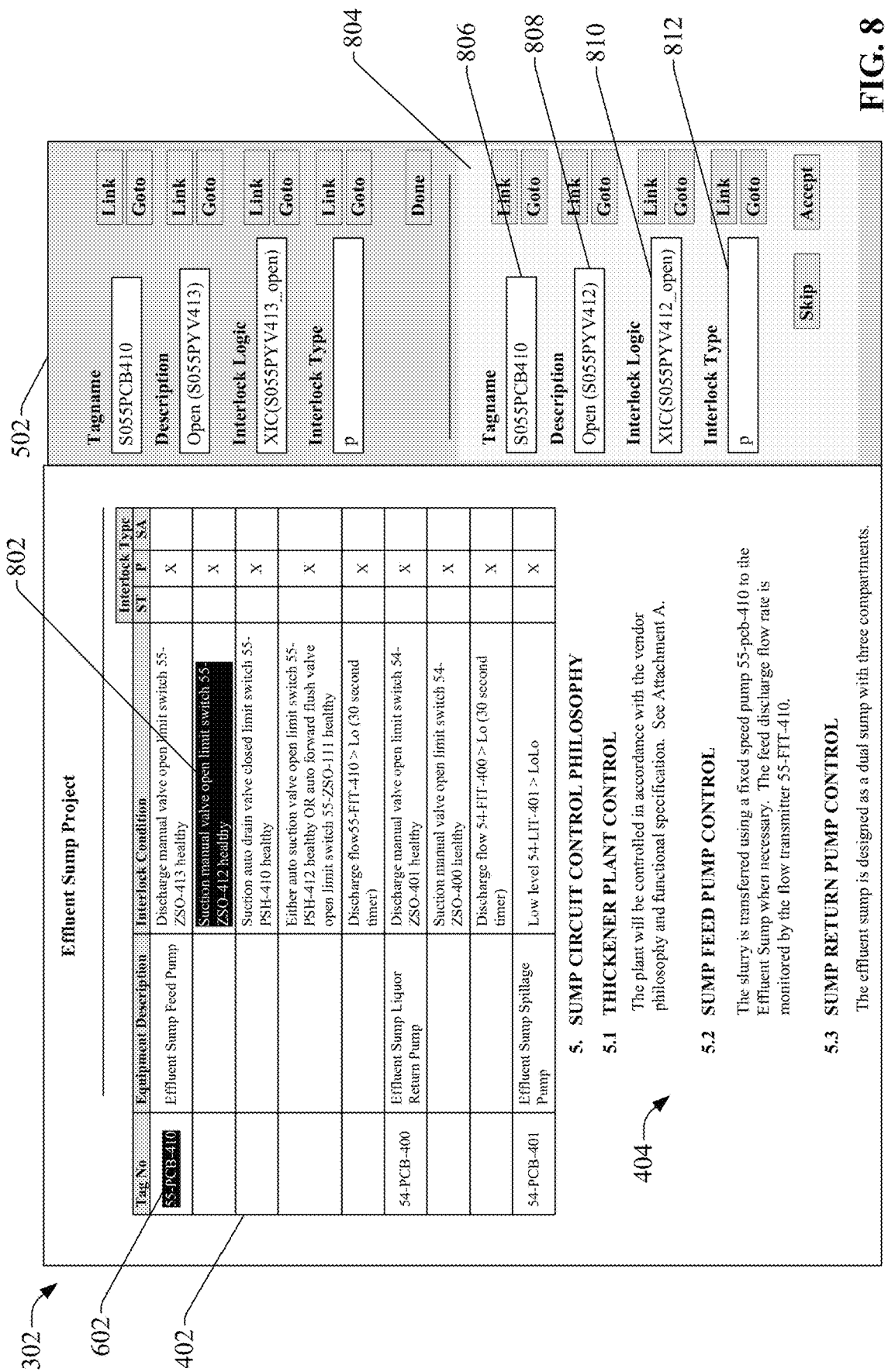
FIG. 8 is a depiction of an engineering document and annotation window in which a second potential interlock description has been discovered and is presented to the user for approval.

FIG. 8 is a depiction of engineering document 302 and annotation window 502 in which a second potential interlock description has been discovered and is presented to the user for approval. In this example, the document analysis component 210 has discovered text 802 within table 402 having a format similar to that of text 512, which the user had previously annotated with interlock logic as described above in connection with FIG. 5. In particular, the originally selected text 512 reads "Discharge manual valve open limit switch 55-ZSO-413 healthy," while discovered text 802 reads "Suction manual valve open limit switch 55-ZSO-412 healthy." These portions of text differ only in their corresponding italicized portions describing the name of the valve and the name of the limit switch, and otherwise conform to a similar descriptive format. Accordingly, the document analysis component 210 has identified text 802 as a potential interlock description, and automatically highlights the discovered description for review.

Furthermore, the document analysis component 210 has determined, based on the formatting of table 402, that the newly discovered interlock description text 802 is intended to be applied to the same tag number—represented by text 602—as the previously defined interlock, and highlights this text 602 accordingly.

Upon discovery of this potential interlock, user interface component 204 renders a new annotation section 804 within annotation window 502 and automatically populates the Tagname, Description, Interlock Logic, and Interlock Type fields of the new interlock section 804 based on inferences drawn from the previous user-provided annotation to text 512, applying these inferences to the newly discovered text 802. For example, based on the user's previous association of interlock logic "XIC(S055PYV413_open)" with text 512, the document analysis component 210 infers that the interlock represented by text 802 should also be an XIC instruction. Moreover, based on the previously entered interlock logic, the document analysis component 210 infers that the tag name to be used as the parameter for the XIC instruction can be derived from the "55-ZSO-412" portion of the text. This inference is based on the observation that the "S055PYV413_open" XIC parameter of the previously entered interlock logic was likely derived from the "55-ZSO-413" portion of text 512, given similarities in nomenclature and the presence of the number "413" in both the text 512 and the annotated interlock logic. Accordingly, document analysis component 210 infers that the correct interlock logic for text 802 is "XIC(S055PYV412 open)," which is similar to the interlock logic for text 512 but replaces "413" with "412" in the tag name (since this substitution is found in the text 802 relative to text 512). The Interlock Logic field 810 is populated with this provisional interlock logic. The interlock description is inferred in a similar manner and automatically entered in the Description field 808. The interlock type is assumed to be the same as the previous user-defined interlock, and the Interlock Type field 812 is automatically populated accordingly.

As noted above, the document analysis component 210 infers that the discovered interlock description text 802 is intended to be applied to the same tag as the previous user-defined interlock, represented by Tag Number text 602. Accordingly, the Tagname field 806 is automatically populated with the same tag name as the previous interlock.

In general, document analysis component 210 is trained to discover interlock or step sequence descriptions within the document 302 based on the annotations initially provided to the system 202 by the user as described above in connection with FIGS. 5 and 6. In this regard, the document analysis component 210 examines the text 512 highlighted in the document 302 by the user, compares this text 512 to the interlock information entered in the annotation window 502, and infers which part of the highlighted text 512 corresponds to tag names within the annotated data (e.g., the tag name to which the interlock applies, as entered in the Tagname field 504, or tag name parameters within the interlock logic as entered in the Interlock Logic field 508). Based on this comparison, the document analysis component 210 also learns which portions of the text 512 contain data that should be extracted and translated to interlock control logic, including characteristics of the text 512 that indicate the type of control logic instruction that should be used (e.g., XIC, XIO, etc.) and portions of the text 512 from which instruction parameters or tag names can be derived. Document analysis component 210 also learns which parts of the highlighted text 512 are irrelevant with regard to generating the interlock programming and can therefore be ignored in subsequent analysis. The model update component 216 trains the learning model 224 based on these learned attributes, and the model 224 can then be used by the document analysis component 210 to perform further document analysis, as will be discussed in more detail below.

Figure 7B:
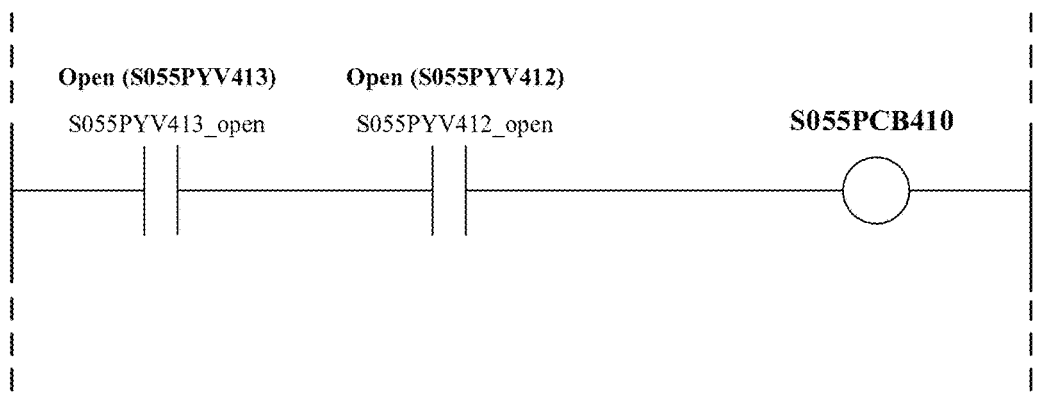
FIG. 7b is a second example ladder logic code segment.

When the document analysis component 210 discovers text 802 corresponding to another interlock or sequence and populates fields 806, 808, 810, and 812 with inferred interlock logic for this text 802, the system 202 permits the user to review this proposed logic and either accept, modify, or deny the proposed interlock. Selection of the Accept button in section 804 updates the provisional control logic to add the newly accepted interlock definition. In the present example, accepting the proposed interlock definition in FIG. 8 updates the interlock logic for tag S055PCB410 shown in FIG. 7a to yield the updated logic shown in FIG. 7b. If the user modifies any of the interlock fields prior to acceptance, those modifications will be reflected in the resulting interlock control logic upon acceptance. If the user enters an indication that the proposed interlock should not be implemented (e.g., by selecting a Skip button), the system 202 proceeds to the next discovered potential interlock.

Figure 7C:
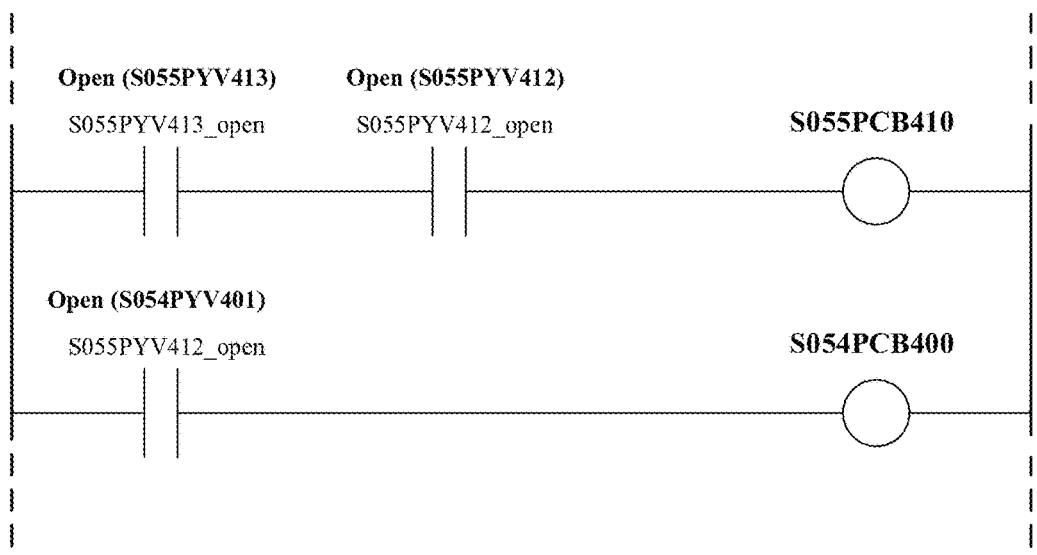
FIG. 7c is a third example ladder logic code segment.
Figure 9:
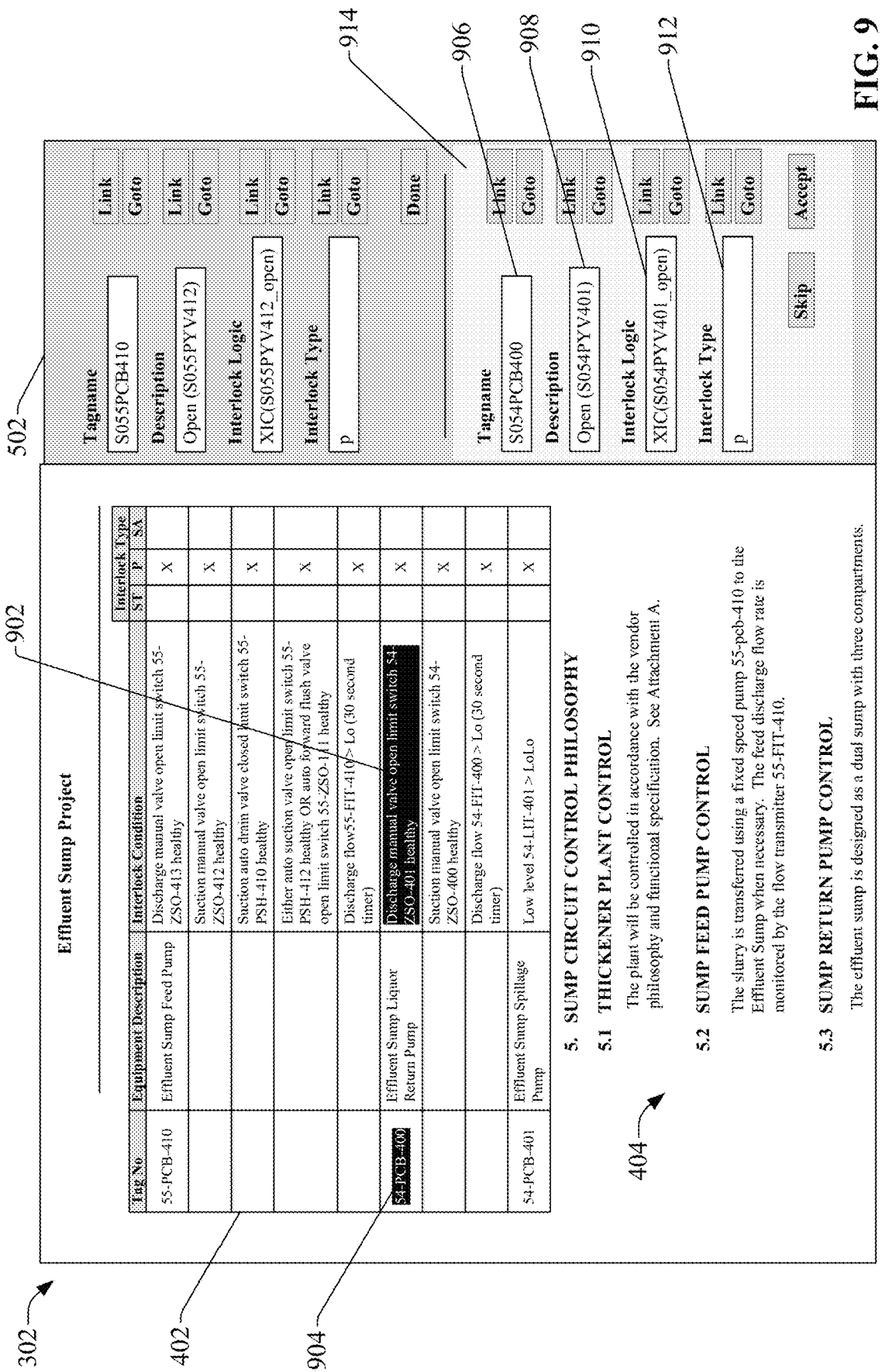
FIG. 9 is a depiction of an engineering document and annotation window in which a document analysis component has discovered a description of an interlock associated with a tag.

The system 202 continues processing document 302 in this manner, presenting each discovered text block assumed to represent an interlock or sequence definition, presenting inferred logic for the interlock or sequence in the annotation window 502, and allowing the user to accept, modify, or reject the proposed logic. FIG. 9 is a depiction of engineering document 302 and annotation window 502 in which the document analysis component 210 has discovered a description of an interlock—represented by text 902 in table 402—associated with a different tag represented by text 904. As in the previous example, upon discovery of this presumed interlock description, a section 914 of annotation window 502 corresponding to the discovered interlock is automatically populated with a presumed tag name (derived from text 904 based on previously entered or approved tag name annotations), description, interlock logic (derived from text 902 in a similar manner), and interlock type. Accepting this suggested interlock logic causes the code generation component 212 to update the control logic with a new interlock for the tag represented by text 904, as illustrated in FIG. 7c.

Although the previous examples illustrate discovery and automated programming of interlocks, system 202 can apply a similar approach to generate step sequence logic based on descriptions of operational sequences described in the documents 302. When annotating a step sequence, the annotation window 502 can render a different set of annotation data fields for entry of step sequence logic, and allow the user to link this step sequence logic to selected text within the document 302 describing the sequence being programmed. Based on these annotations, the document analysis component 210 can search the document 302 for similarly formatted or structured text indicative of a step sequence, infer step sequence logic for the discovered sequence description, and present this logic to the user for approval.

In the examples depicted in FIGS. 4-8, the inference that a segment of text (e.g., text 902) describes an interlock for a tag identified by another segment of text (e.g., tag 904) is based in part on the structured data format of table 402. However, document analysis component 210 can also infer correlations between text identifying a tag and text describing an interlock for that tag even in scenarios in which the text is not in a structured table format. Returning to FIG. 3, inferences regarding correlations between interlock description text and corresponding tag name text, as well as inferences of how this discovered text should be translated to interlock control code, are based on the adaptive learning model 224 referenced by the document analysis component 210 in connection with document analysis. Learning model 224 can be trained over time to recognize sentence or paragraph structures within engineering documents 302 indicative of interlock and sequence descriptions, how these text structures should be translated to logic and tag names, and how to identify tag identifiers within the documents 302 to which the discovered interlock or sequence descriptions should be applied.

Model update component 216 can employ active learning to train the learning model 224 over time based on annotations 304 entered by engineers on multiple documents 302, thereby improving the accuracy of coding recommendations carried out by the document analysis component 210. In this way, as more documents 302 are processed and user feedback is received (in the form of annotations 304 and code corrections or approvals), the ability of document analysis component 210 to accurately identify interlock or sequence text and to correctly translate this text to control programming improves. As noted above, this training can include learning to recognize sentence or paragraph patterns indicative of interlocks or sequences, learning which parts of these sentences or paragraphs correspond to tag names, learning how to translate these portions of the text to tag names and control code, learning which parts of relevant text can be ignored for the purposes of generating control code, etc. Once the learning model 224 becomes sufficiently intelligent as a result of this training, the system 202 can being generating interlock and sequence code from newly submitted engineering documents 302 without requiring the user to enter initial annotations 304 as a guide (while still affording the user an opportunity to approve, modify or reject proposed interlock and sequence code recommended by the system 202).

Figure 10:
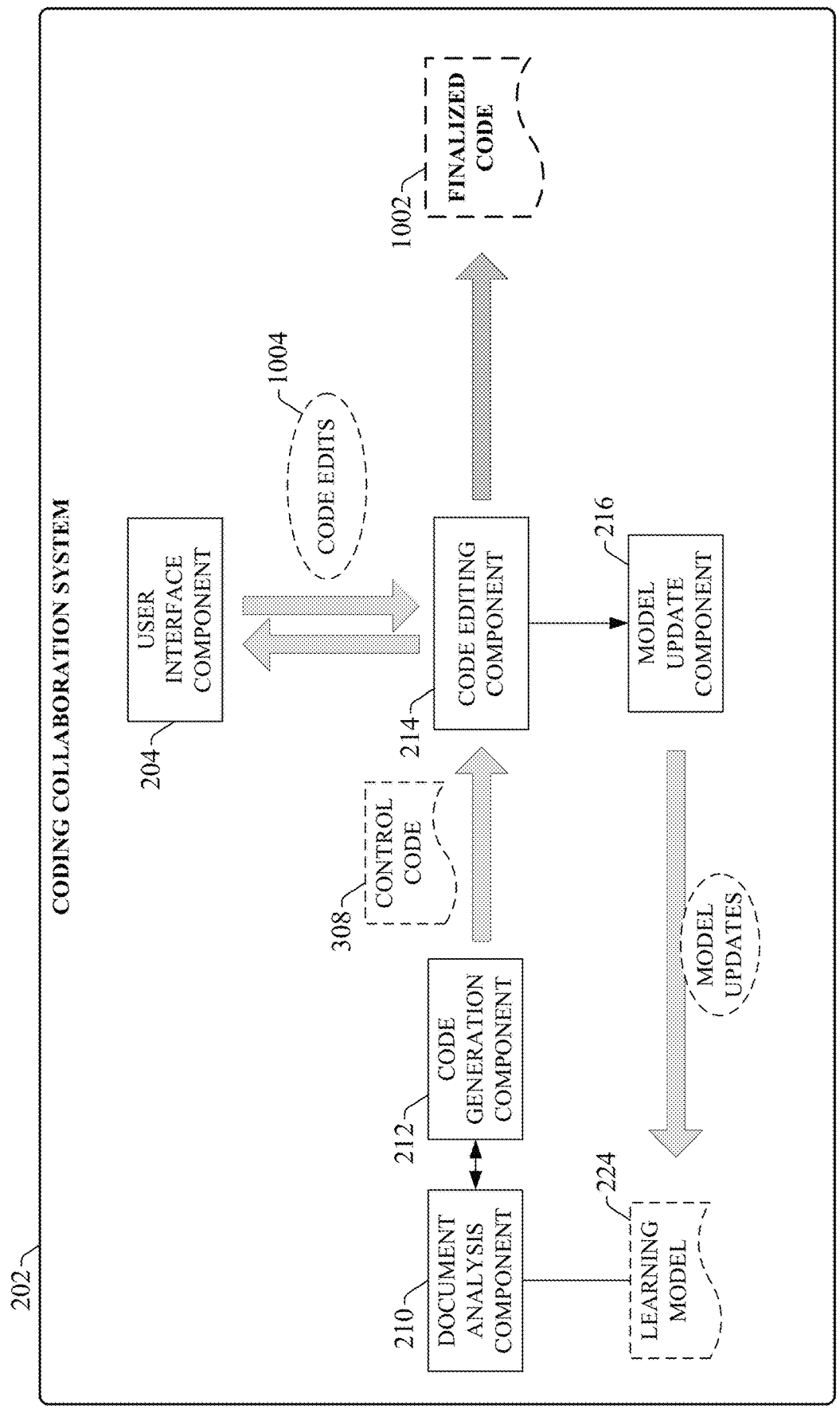
FIG. 10 is a diagram illustrating generation and output of finalized control code by the coding collaboration system.

FIG. 10 is a diagram illustrating generation and output of finalized control code 1002 by the coding collaboration system 202. Control code 308 comprising industrial controller programming (e.g., ladder logic or another type of control programming) for the various interlocks and/or sequences defined in the design document 302 is generated by the code generation component 212 using the workflow described above. As described in the foregoing example, the code generation component 212 can generate the control code 308 in an incremental manner as the user accepts, or modifies and accepts, each proposed interlock or sequence recommended by the document analysis component 210. Alternatively, the code generation component 212 can generate an initial version of the control code 308 that includes programming for all the discovered interlocks and sequences during an initial analysis of the entire document 302 and allow the user to subsequently review the code 308 for accuracy. In either case, the control code 308 created by the code generation component 212 can then be opened and viewed by the user within a program development platform supported by the system's code editing component 214 (e.g., a ladder logic editor).

If desired, the user can submit code edits 1004 (via code editing component 214) to modify or add to the control code 308 via this development platform. These edits can comprise corrections to any of the programming generated by the code generation component 212, integration of the control code 308 into a primary control program for the automation system being developed, addition of new control programming, or other such edits. Code editing component 214 can modify the control code 308 in accordance with the code edits 1004, and the resulting edited code can then be saved as finalized code 1002. This finalized code 1002 can then be installed on an industrial controller (e.g., a PLC) that will be monitoring and controlling the automation system, thereby programming the controller to control the output devices identified in the design document 302 in accordance with the interlock and sequence programming. Any corrections to the generated interlock or sequence programming can be used by the model update component 216 to further train the learning model 224 (e.g., to train the model 224 to incorporate similar corrections as appropriate in subsequently generated code).

The coding collaboration system 202 can support collaborative development of control code 308 using the approaches discussed above. For example, multiple control engineers working on aspects of the control project from the same set of engineering documents 302 can log into the system 202 under their own unique identifiers, submit annotations 304 to selected portions of the documents 302, and generate control code 308 based on these annotations. User interface component 204 can also allow users to view annotations 304 that have been submitted to the documents 302 by other users, with each annotation labeled with the identity of the user who submitted the annotation.

In some embodiments, a user with suitable authorization can modify an interlock or sequence annotation that was added by another user, or an automatically generated interlock or sequence annotation that was derived based on another user's annotation. In response to receipt of such a modification, the document analysis component 210 will cascade the modification as necessary throughout the document 302, updating any annotations that were generated based on the modified annotation so that those annotations reflect the modification. The code generation component 212 also updates the control code 308 as necessary to reflect the modification. In some embodiments, the system 202 can be configured such that newly submitted annotations 304 require approval by multiple engineers before the system 202 will translate the annotations into control code 308 or use the annotations as the basis for automatically generated code elsewhere in the document 302.

In another example collaborative scenario, an engineering document 302 (or multiple engineering documents) may be divided into sections to which respective different control engineers are assigned. Each engineer is permitted to enter annotations within their portion of the documents 302, and these annotations are used by the document analysis component 210 to generate control code from both the annotated text and similarly formatted text discovered within the document 302, as discussed above. If the annotations entered by a first engineer are applicable to a portion of the document 302 assigned to a second engineer—e.g., the document analysis component 210 finds a block of text in the second engineer's portion of the document 302 having a format similar to the text annotated by the first engineer— the document analysis component 210 can render a notification on the second engineer's view of the project indicating that the first engineer has entered an annotation that is applicable to text found in the second engineer's portion of the document. As part of the notification, the document analysis component 210 can highlight the relevant text and present the suggested interlock or sequence logic to be applied to the text in an annotation window 502, where this suggested logic is modeled after the first engineer's annotations. The notification can also prompt the second engineer to either accept or reject the proposed logic. The notification may also identify the first engineer whose annotations served as the basis for the logic recommendation. If accepted, the code generation component 212 updates the control code 308 to add the suggested interlock or sequence logic.

In some embodiments, the system 202 can also relay messages or notifications between engineers working on the same project. This allows engineers to notify each other of mistakes discovered in one another's annotations, to ask questions regarding preferred logic formatting, or share other such information.

The learning model 224 that was trained during development of a given control project can also be applied to engineering documents 302 of other projects subsequently submitted to the system 202. If the learning model 224 has been sufficiently trained based on previous engineer input, the system 202 can begin searching for interlock and sequence descriptions within the newly submitted documents 302 without requiring annotations to be entered by the user, and begin presenting recommended interlock and sequence logic for user approval based on analysis of the new document 302. In this way, the coding collaboration system 202 can quickly generate interlock and sequence control coding for a new project while maintaining uniform adherence to a preferred coding style learned from previous control projects.

The coding collaboration system 202 described herein can greatly reduce the time required to generate interlock and sequence control code based on text-based engineering documents. This is achieved by substantially automating generation of interlock and sequence code based on descriptions found in the engineering documents as well as user-provided annotations that teach the system how to translate plain language descriptions within the document into executable control code. Moreover, by using a relatively small number of user-provided annotations as the basis for generation of control code throughout the document, the system 202 can ensure a consistency of coding style throughout the project. This approach can also reduce or eliminate coding errors that may otherwise arise if control engineers were required to manually generate control code using the design documents as a reference. Collaborative features supported by the system 202 allow engineers to easily share annotations and code, or to easily apply previously established coding styles to new control projects.

FIGS. 11*a*-11*d* illustrate a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 11A:
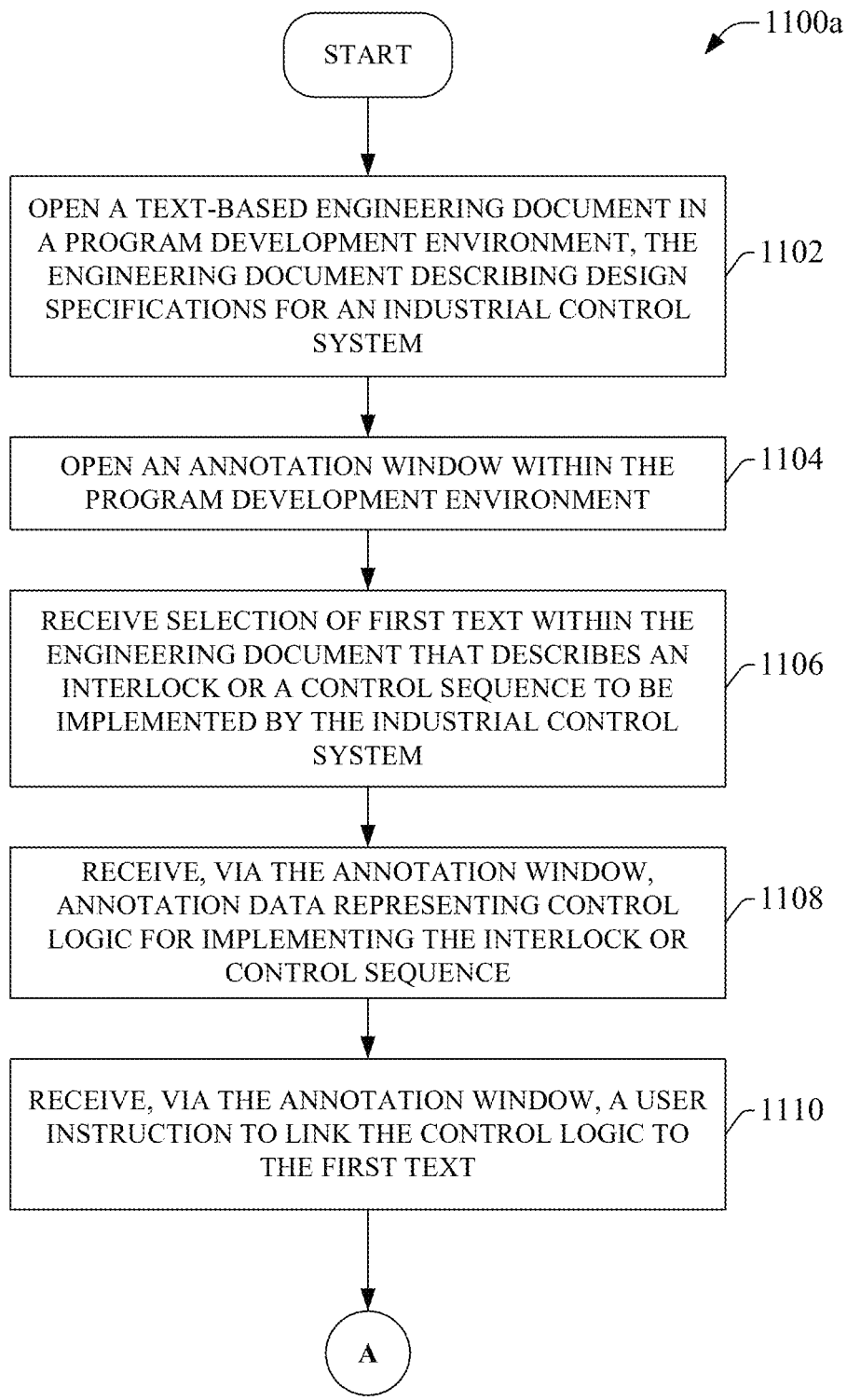
FIG. 11a is a flowchart of a first part of an example methodology for generating executable control code based on analysis of a text-based engineering document.

FIG. 11*a* illustrates a first part of an example methodology 1100*a* for generating executable control code based on analysis of a text-based engineering document. Initially, at

1102, a text-based engineering document is opened in a program development environment. The engineering document can be, for example, a written functional specification or control philosophy for an industrial control system being designed. At 1104, an annotation window is opened within the program development environment. The annotation window comprises data fields for entering annotations to be linked to the engineering document.

At 1106, selection of first text within the engineering document is received. The first text describes, in plain language, an interlock or control sequence to be implemented by the industrial control sequence. The first text can be selected, for example, by highlighting the text within the document.

At 1108, annotation data representing control logic for implementing the interlock or control sequence described by the first text is received via the annotation window. The annotation data can comprise, for example, an indication of a control program instruction (e.g., an XIC or XIO instruction) and any parameters associated with the instruction (e.g., a controller data tag on which the instruction operates). At 1110, a user instruction to link the control logic received at step 1108 to the first text selected at step 1106 is received via the annotation window. This instruction can be input, for example, by selecting a Link button or another type of control.

Figure 11B:
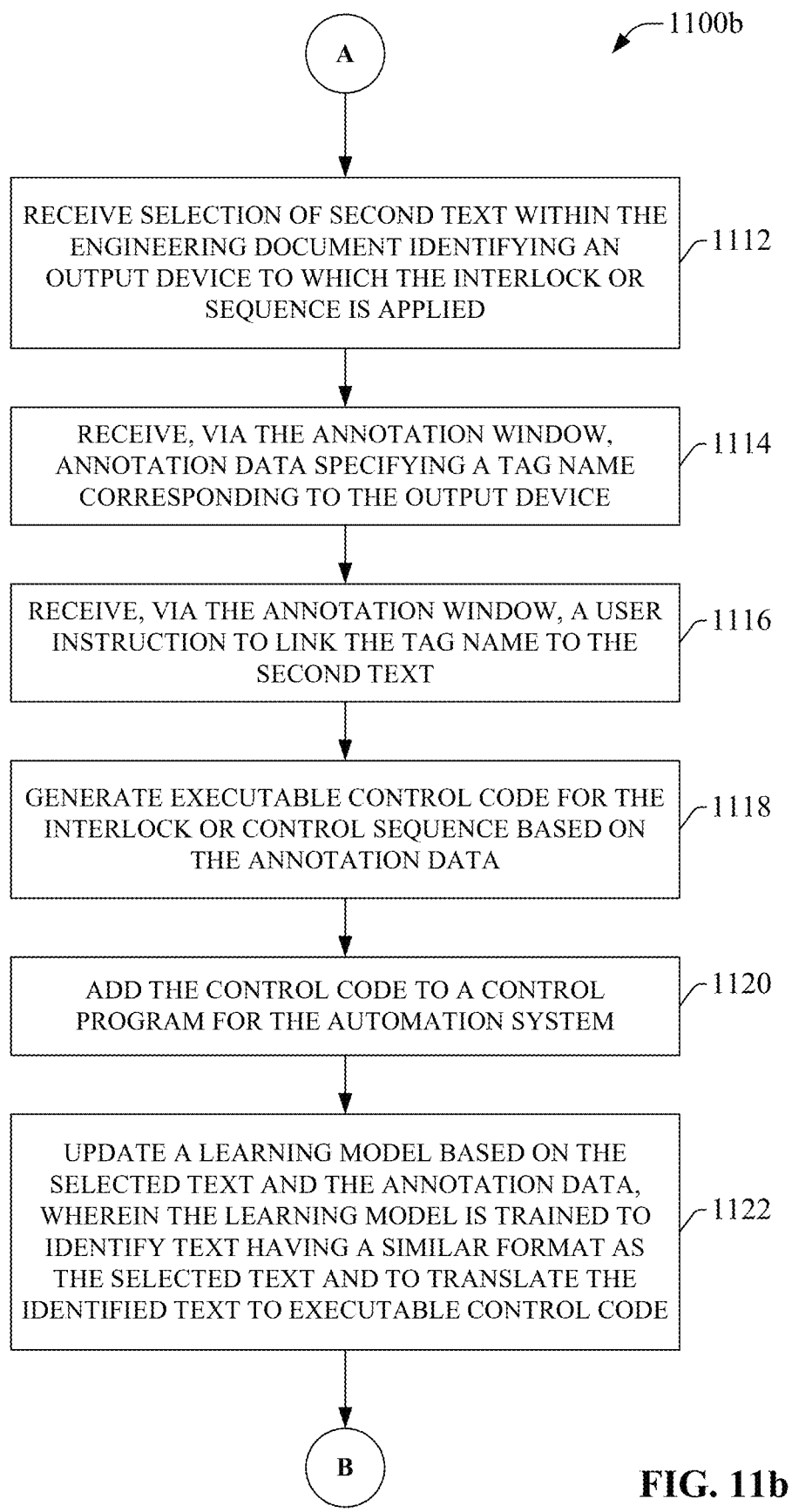
FIG. 11b is a flowchart of a second part of the example methodology for generating executable control code based on analysis of a text-based engineering document.

The methodology continues with the second part 1100b illustrated in FIG. 11b. At 1112, selection of second text within the engineering document is received. The second text identifies an output device (e.g., a valve, an actuator, a machine start control device, a motor contactor, a motor drive, etc.) to which the interlock or sequence is to be applied. As with the first text, the second text can be selected by highlighting the text within the document. At 1114, annotation data specifying a tag name corresponding to the output device is received via the annotation window. At 1116, a user instruction to link the tag name received at step 1114 to the second text selected at step 1112 is received via the annotation window.

At 1118, executable control code for the interlock or sequence is generated based on the annotation data received at steps 1108 and 1114. At 1120, the control code generated at step 1118 is added to a control program for the automation system.

At 1122, a learning model is updated based on the first and second text selected at steps 1106 and 1112 and the corresponding annotation data received at steps 1108 and 1114. The learning model is trained, based in part on this information, to identify text within engineering documents having a similar format as that of the selected first and second text, and to translate this identified text to executable control code using the annotation data as a guide.

Figure 11C:
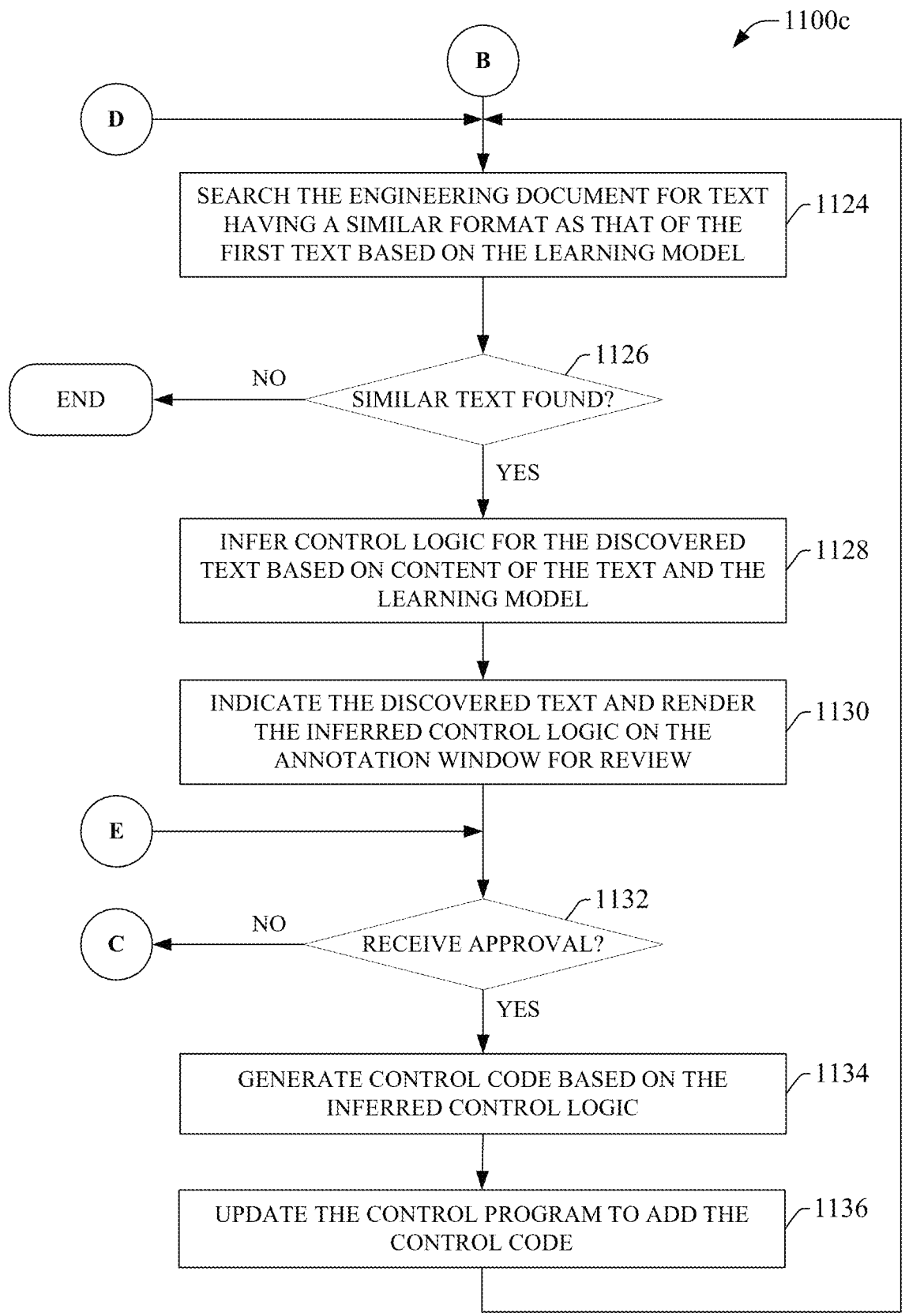
FIG. 11c is a flowchart of a third part of the example methodology for generating executable control code based on analysis of a text-based engineering document.

The methodology then proceeds to the third part 1100c illustrated in FIG. 11c. At 1124, the engineering document is searched for text having a similar format as that of the first text. Such text can be identified based on the trained learning model. At 1126, a determination is made as to whether text similar to the first text is found within the engineering document. If such text is not found (NO at step 1126, the methodology ends. Alternatively, if such text is found (YES at step 1126), the methodology proceeds to step 1128, where control logic for the discovered text is inferred based on content of the text and the learning model. At 1130, the text discovered at step 1126 is indicated (e.g., by rendering a highlight on the text) and the control logic inferred at step 1128 is rendered on the annotation window for review.

At step 1132, a determination is made as to whether approval of the inferred control logic is received. If the approval is received (YES at step 1132, the methodology proceeds to step 1134, where control code is generated based on the inferred control logic. At 1136, the control program is updated to add the control code generated at step 1136. The methodology then returns to step 1124, where another search is performed on the document to discover text similar to the first text.

Figure 11D:
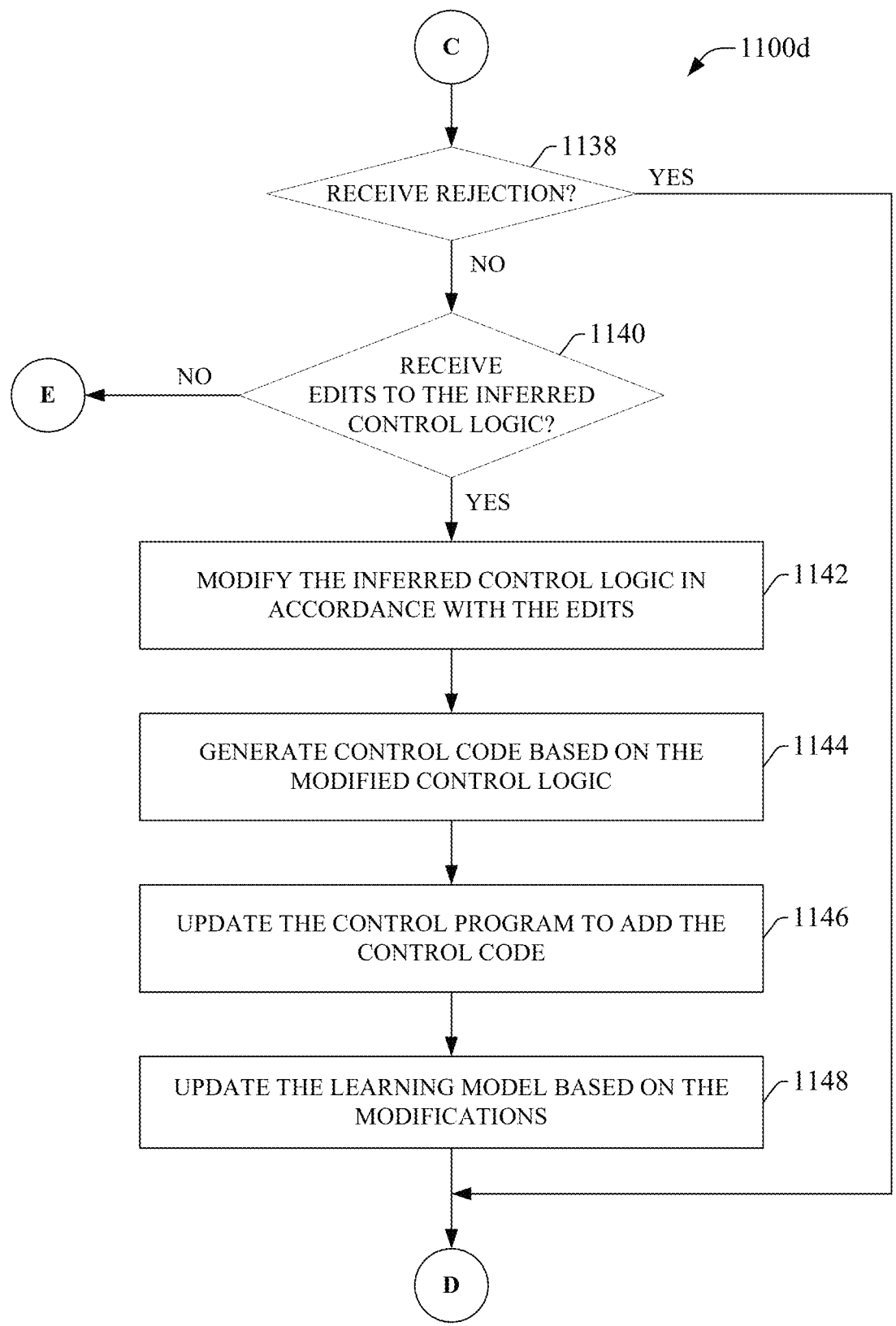
FIG. 11d is a flowchart of a fourth part of the example methodology for generating executable control code based on analysis of a text-based engineering document.

If approval for discovered text is not received (NO at step 1132), the methodology proceeds to the fourth part 1100d illustrated in FIG. 11d. At 1138, a determination is made as to whether a rejection of the control logic inferred at step 1128 is received. If a rejection is received (YES at step 1138), the methodology returns to step 1124 without generating control code for the inferred control logic, and the search for other text similar to the first text continues. Alternatively, if no rejection is received (NO at step 1138), the methodology proceeds to step, 1140, where a determination is made as to whether edits to the control logic inferred at step 1128 are received. If no such edits are received (NO at step 1140), the methodology returns to step 1132, and the methodology awaits receipt of either approval of the inferred control logic, rejection of the inferred control logic, or edits to the inferred control logic. Alternatively, if edits are received (YES at step 1140), the methodology proceeds to step 1142, where the control logic inferred at step 1128 is modified in accordance with the edits received at 1140. At 1144, control code is generated based on the modified control logic obtained at step 1142. At 1146, the control program is updated to add the control code generated at step 1144. At 1148, the learning model is updated based on the modifications received at step 1140, thereby refining the learning model's ability to accurately translate discovered text within the engineering document to executable control code in accordance with the user's preferences. The methodology then returns to step 1124 and continues to execute until no further text similar to the first text is found in the engineering document.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and EtherNet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 12:
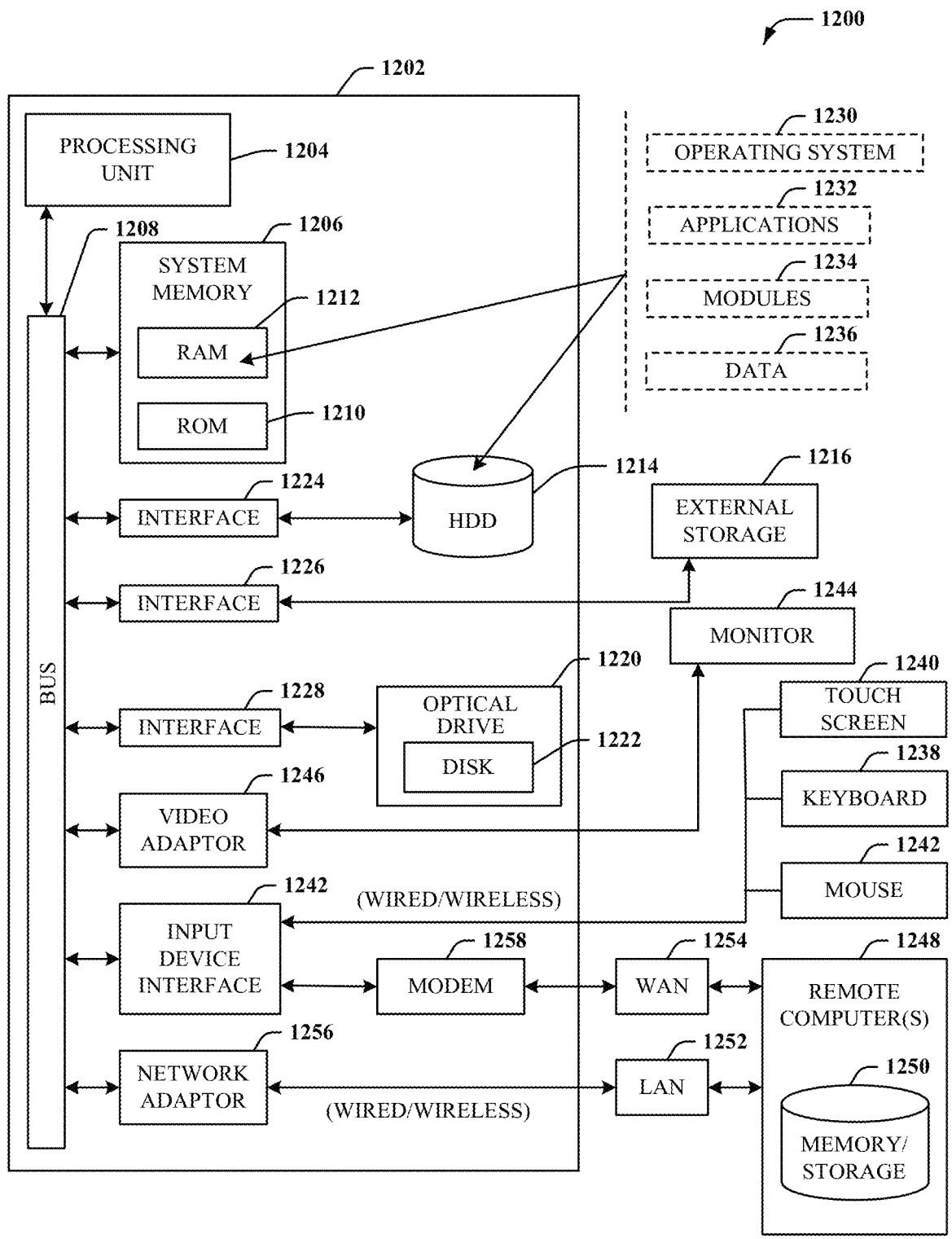
FIG. 12 is an example computing environment.
Figure 13:
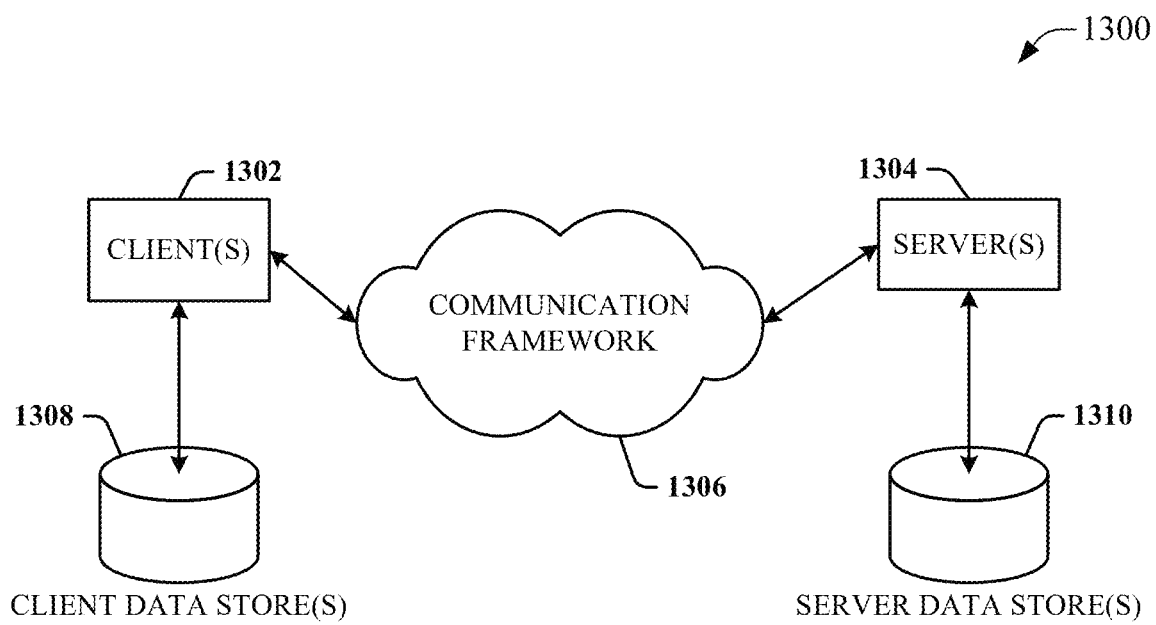
FIG. 13 is an example networking environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for application programs 1232. Runtime environments are consistent execution environments that allow application programs 1232 to run on any operating system that includes the runtime environment. Similarly, operating system 1230 can support containers, and application programs 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1244 or other type of display device can be also connected to the system bus 1208 via an interface, such as a video adapter 1248. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the adapter 1256 in a wireless mode.

When used in a WAN networking environment, the computer 1202 can include a modem 1258 or can be connected to a communications server on the WAN 1254 via other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1252 or WAN 1254 e.g., by the adapter 1256 or modem 1258, respectively. Upon connecting the computer 1202 to an associated cloud storage system, the external storage interface 1226 can, with the aid of the adapter 1256 and/or modem 1258, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server(s) 1304 are operably connected to one or more server data store(s) 1310 that can be employed to store information local to the servers 1304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for generating industrial control programming, comprising:
    a processor, operatively coupled to a memory, that executes executable components stored on the memory, the executable components comprising:
        a user interface component configured to render, on a client device, a text-based engineering document for an industrial automation system, and to receive selection input that selects first text within the engineering document, wherein the text-based engineering document describes control requirements for the industrial automation system in plain language;
        an annotation component configured to receive, via the user interface component, annotation data describing first control logic for an interlock or step sequence to be implemented by an industrial controller of the industrial automation system, and to associate the annotation data with the first text;
        a code generation component configured to generate first control code for the interlock or step sequence based on the first control logic defined by the annotation data, wherein the first control code is executable on the industrial controller;
        a model update component configured to update a learning model to record relationships between the first text and first control logic defined by the annotation data, wherein the learning model is trained to identify text having a format similar to that of the first text and to translate the text to control logic; and
        a document analysis component configured to
            identify, based on the learning model, second text having the format similar to that of the first text,
            generate second control logic based on application of the relationships defined in the learning model to the second text, and
            generate second control code based on the second control logic.

2. The system of claim 1, wherein the relationships comprise at least one of a type of control instruction associated with a format of the first text or a correlation between a portion of the first text and a tag name included in the first control logic.

3. The system of claim 1, wherein
    the annotation component is further configured to receive an edit to the annotation data that modifies the first control logic, and the code generation component is configured to, in response to receipt of the edit, update the first control code and the second control code in accordance with the edit.

4. The system of claim 1, further comprising a code editing component configured to modify the second control logic in accordance with code editing input received via the user interface component to yield modified control logic, wherein the code generation component is configured to update the second control code based on the modified control logic.

5. The system of claim 4, wherein the model update component is further configured to update the learning model based on the code editing input.

6. The system of claim 1, wherein the engineering document is at least one of a functional specification document or a control philosophy document.

7. The system of claim 1, wherein
the annotation data further comprises at least one of a tag name to which the interlock or step sequence applies, a description of the interlock or step sequence, or an interlock type, and
the code generation component is configured to generate the first control code based on at least one of the tag name, the description, or the interlock type.

8. A method for generating industrial control code, comprising:
rendering, by a system comprising a processor, a text-based engineering document for an industrial automation system, wherein the text-based engineering document describes control requirements for the industrial automation system in plain language;
receiving, by the system, selection input that selects first text within the engineering document;
receiving, by the system, annotation data describing first control logic for an interlock or step sequence to be implemented by an industrial controller of the industrial automation system;
associating, by the system, the annotation data with the first text;
generating, by the system, first control code for the interlock or step sequence based on the first control logic defined by the annotation data, wherein the first control code is executable on the industrial controller;
training, by the system, a learning model based on the first text and the annotation data, wherein the training comprises recording relationships between the first text and the first control logic, and the learning model is trained to identify text having a format similar to that of the first text and to translate the text to control logic;
identifying, by the system based on the learning model, second text within the engineering document having the format similar to that of the first text; and
in response to the identifying:
inferring, by the system, second control logic based on application of the relationships defined in the learning model to the second text; and
generating, by the system, second control code based on the second control logic.

9. The method of claim 8, wherein the recording of the relationships comprises recording at least one of a type of control instruction associated with a format of the first text or a correlation between a portion of the first text and a tag name included in the first control logic.

10. The system of claim 8, further comprising:
receiving, by the system, an edit to the annotation data that modifies the first control logic; and
in response to the receiving of the edit, updating, by the system, the first control code and the second control code in accordance with the edit.

11. The method of claim 8, further comprising:
receiving, by the system, code editing input that modifies the second control logic to yield modified control logic; and
modifying, by the system, the second control code based on the modified control logic.

12. The method of claim 11, further comprising training, by the system, the learning model based on the code editing input.

13. The method of claim 8, wherein the engineering document is at least one of a functional specification document or a control philosophy document.

14. The method of claim 8, wherein
the annotation data further comprises at least one of a tag name to which the interlock or step sequence applies, a description of the interlock or step sequence, or an interlock type, and
the generating of the first control code comprises generating the first control cod based on at least one of the tag name, the description, or the interlock type.

15. A non-transitory computer-readable medium having stored thereon instructions that, in response to execution, cause a system comprising a processor to perform operations, the operations comprising:
displaying, on a client device, a text-based engineering document for an industrial automation system, wherein the text-based engineering document describes control requirements for the industrial automation system in plain language;
receiving selection input that selects first text within the engineering document;
receiving annotation data describing first control logic for an interlock or step sequence to be implemented by an industrial controller of the industrial automation system;
associating the annotation data with the first text;
generating first control code for the interlock or step sequence based on the first control logic defined by the annotation data, wherein the control code is executable on an industrial controller;
training a learning model based on the first text and the annotation data, wherein the training comprises recording relationships between the first text and the first control logic, and the learning model is trained to identify text having a format similar to that of the first text and to translate the text to control logic; and
identifying, based on the learning model, second text having the format similar to that of the first text; and
in response to the identifying:
inferring second control logic based on application of the relationships defined in the learning model to the second text; and
generating second control code based on the second control logic.

16. The non-transitory computer-readable medium of claim 15, wherein the recording of the relationships comprises recording at least one of a type of control instruction associated with a format of the first text or a correlation between a portion of the first text and a tag name included in the first control logic.

17. The non-transitory computer-readable medium of claim 15, wherein the operations further comprise:
receiving an edit to the annotation data that modifies the first control logic; and in response to the receiving of the edit, updating the first control code and the second control code in accordance with the edit.

18. The non-transitory computer-readable medium of claim 17, wherein the operations further comprise training the learning model based on the edit.

19. The non-transitory computer-readable medium of claim 15, wherein the engineering document is at least one of a functional specification document or a control philosophy document.

20. The non-transitory computer-readable medium of claim 15, wherein
  the annotation data further comprises at least one of a tag name to which the interlock or step sequence applies, a description of the interlock or step sequence, or an interlock type, and
  the generating of the first control code comprises generating the first control cod based on at least one of the tag name, the description, or the interlock type.

\* \* \* \* \*